US011537764B2

(12) United States Patent
Kubicki et al.

(10) Patent No.: US 11,537,764 B2
(45) Date of Patent: Dec. 27, 2022

(54) BIM MODELLING WITH FLEXIBILITY ATTRIBUTES

(71) Applicant: Luxembourg Institute of Science and Technology (LIST), Esch-sur-Alzette (LU)

(72) Inventors: Sylvain Kubicki, Arlon (BE); Elie Daher, Metz (FR)

(73) Assignee: Luxembourg Institute of Science and Technology (LIST), Esch/Alzette (LU)

( * ) Notice: Subject to any disclaimer, the term of this patent is extended or adjusted under 35 U.S.C. 154(b) by 352 days.

(21) Appl. No.: 16/472,594

(22) PCT Filed: Dec. 22, 2017

(86) PCT No.: PCT/EP2017/084345
§ 371 (c)(1),
(2) Date: Jun. 21, 2019

(87) PCT Pub. No.: WO2018/115420
PCT Pub. Date: Jun. 28, 2018

(65) Prior Publication Data
US 2019/0318048 A1    Oct. 17, 2019

(30) Foreign Application Priority Data

Dec. 23, 2016   (LU) .......................................... 93399

(51) Int. Cl.
*G06F 30/13* (2020.01)
*G06F 111/02* (2020.01)
(Continued)

(52) U.S. Cl.
CPC .......... *G06F 30/13* (2020.01); *G06F 2111/02* (2020.01); *G06F 2111/20* (2020.01); *G06F 2113/14* (2020.01)

(58) Field of Classification Search
CPC ...... G06F 30/13; G06F 30/00; G06F 2113/14; G06F 2111/02; G06F 2111/20
(Continued)

(56) References Cited

U.S. PATENT DOCUMENTS

2008/0234987 A1    9/2008  Haley
2008/0275674 A1*  11/2008  Reghetti ................. G06F 30/13
                                                        703/1
(Continued)

FOREIGN PATENT DOCUMENTS

WO        2008137018 A1    11/2008

OTHER PUBLICATIONS

Search Report dated Feb. 12, 2018 for Parent PCT Appl. No. PCT/EP2017/084345.
(Continued)

*Primary Examiner* — Cedric Johnson
(74) *Attorney, Agent, or Firm* — James E. Walton

(57) ABSTRACT

The invention is directed to a method of digitally modeling in two, three or more dimensions an infrastructure (2.1, 2.2, 2.3, 2.4), comprising using digital two, three, four, five or more dimensional objects; and attributing at least one flexibility attribute (8.2, 8.3) to at least one of the objects (4, 6, 10). Several digital two, three or more dimensions infrastructure models (2.1, 2.2, 2.3, 2.4) are merged and managed by automatically detecting (14) potential conflict(s) between objects (6, 10) of the models (2.1, 2.2, 2.3, 2.4) and by automatically searching (16) for at least one possible solution to each of the at least one conflict, based on the flexibility attribute(s) (8.2, 8.3) of the objects (6, 10) related to the conflict.

18 Claims, 3 Drawing Sheets

(51) Int. Cl.
*G06F 111/20* (2020.01)
*G06F 113/14* (2020.01)

(58) Field of Classification Search
USPC .............................................................. 703/1
See application file for complete search history.

(56) References Cited

U.S. PATENT DOCUMENTS

| | | |
|---|---|---|
| 2010/0138762 A1 | 6/2010 | Reghetti et al. |
| 2013/0338970 A1* | 12/2013 | Reghetti ................ G06F 30/13 703/1 |
| 2014/0180996 A1 | 6/2014 | Kulusjarvi et al. |
| 2016/0210377 A1* | 7/2016 | Bumbalough .......... G06F 30/13 |

OTHER PUBLICATIONS

Cheng Zhang et al.: "Quantitative Assessment of Building Constructability Using BIM and 4D Simulation", Open Journal of Civil Engineering, vol. 06, No. 03, Jan. 1, 2016, pp. 442-461.
Paola Sanguinetti et al.: "General System Architecture for BIM: An Integrated Approach for Design Analysis", Advanced Engineering Informatics, vol. 26, No. 2, Apr. 1, 2012, pp. 317-333.

\* cited by examiner

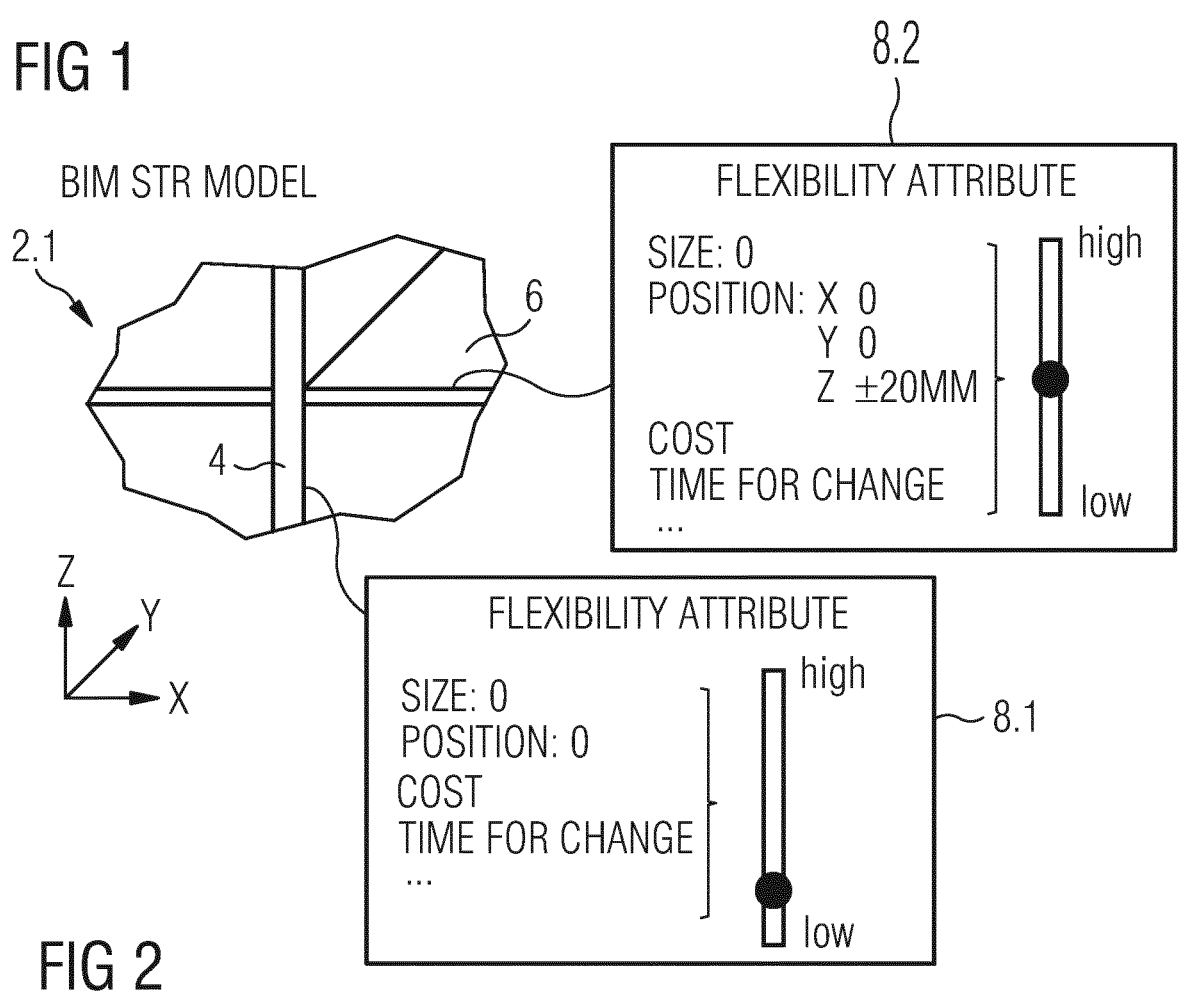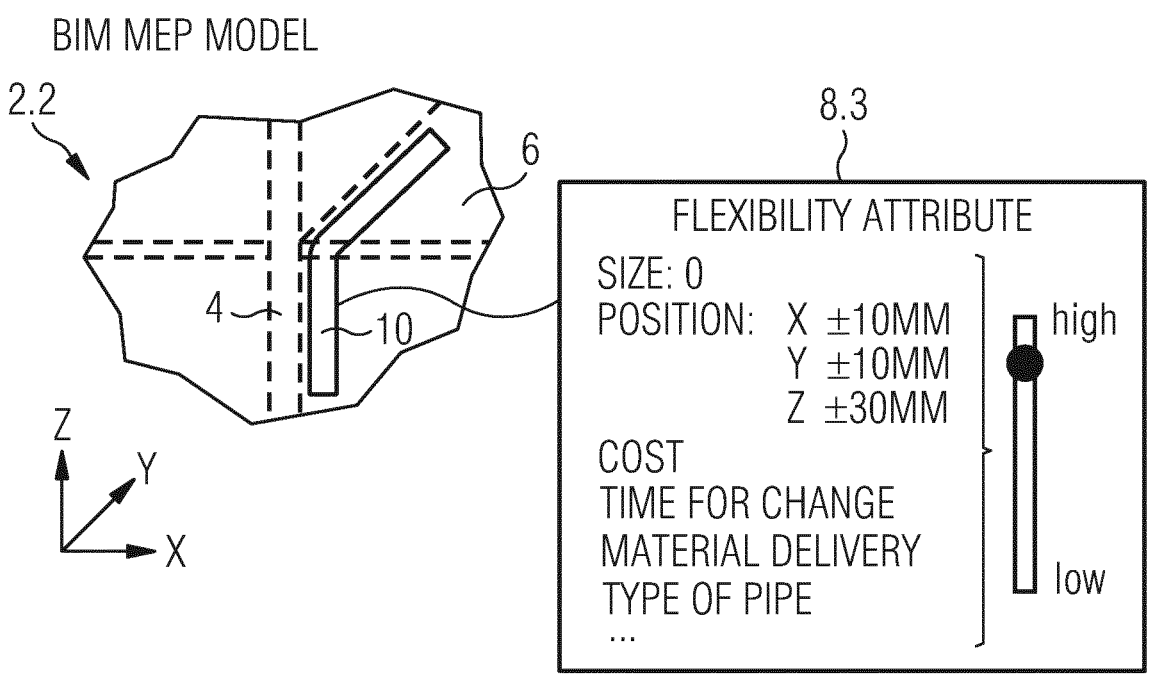

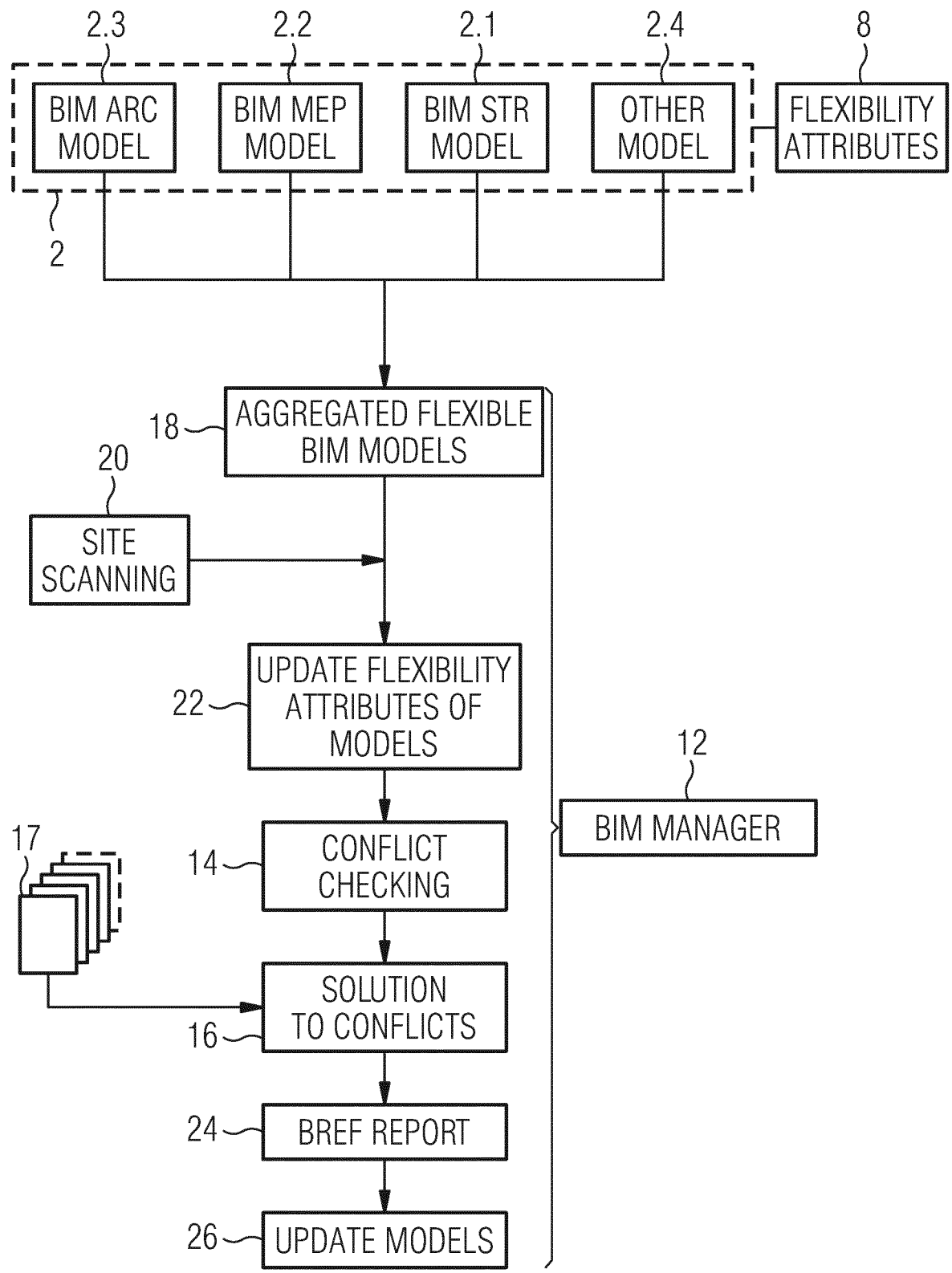

BIM MODELLING WITH FLEXIBILITY ATTRIBUTES

TECHNICAL FIELD

The invention is directed to the field of computational modeling of a physical infrastructure project like a building site, a building, building components, both for existing or new projects, and also the development of a site.

BACKGROUND ART

When designing a physical infrastructure project like a building or a building site, it is common to split the project into several sub-projects, each sub-project dealing with one or several specific aspects of the project, e.g. the architecture of the building, the structure of the building, the mechanical, electrical, plumbing and other equipment of the building, a facade component, etc. For each of these sub-projects, it is common to use a specific design and modeling software that generates building information models (BIM) of the sub-project. Building information modeling (BIM) is a process involving the generation and management of digital representations of physical and functional characteristics of objects or infrastructures. Building information models (BIMs) are files (often but not always in proprietary formats and containing proprietary data) which can be extracted, exchanged or networked.

Prior art patent document published US 2008/0234987 A1 discloses a method for synchronizing project data models, like BIMs, generated by multiple computer applications like AutoCAD® and Civil-3D® on client computers. The method consists essentially, once a project definition is achieved with one of the computer applications, to convert on that application the achieved definition into a unified project definition and to transmit the unified definition to a server for synchronisation. The conversion application can be a plug-in for the computer application. The synchronisation can monitor the unified definition for any modifications received from a client computer. Thereafter, the server determines if the received modification affects other application specific project definitions. If other application-specific project definitions are affected, the unified definition is sent to the converting application of the specific design application responsible for the affected application specific project definition. The converting application converts the unified definition to the application specific project definition and updates the information on the client appropriately.

Prior art patent document published WO 2008/137018 A1 discloses a method for pre-processing a CAD drawing to enhance its usability for subsequent viewing or modification by simplifying information displayed in the drawing, reducing the size of the drawing file, and removing unnecessary data. The method includes a wizard function that can record many of the functions or steps taken by user to modify a drawing and then be used for pre-processing a similar type of drawing using the recorded functions and steps. The main purpose of this simplification is to facilitate the parallel design and design review processes by readily viewing the conflicts and sharing different solution proposals.

Prior art patent document published US 2014/0180996 A1 discloses a model information manager for BIMs that, based on the selection of a rule set, identifies missing BIM model information and displays a corresponding task list to be manually done by a user. For example, a missing information can be the direction of opening of doors according to a rule set that all doors must open inwardly. Once the missing information is completed, the model information manager checks for possible conflicts between the different models.

Each of the above references addresses the question of conflict between objects of different designs for a common project. None of these references discloses a solution for solving the conflict, i.e. the conflict management remains manual.

SUMMARY OF INVENTION

Technical Problem

The invention has for technical problem to provide a solution to at least one drawback of the above cited prior art. More specifically, the invention has for technical problem to provide a facilitated conflict management between digital objects of a building, building site, a building component project or even their surrounding environment.

Technical Solution

The invention is directed to a method of digitally modeling in two, three, or more dimensions an infrastructure, comprising using digital two- or three-dimensional objects; wherein the method comprises attributing at least one flexibility attribute to at least one of the objects.

Each of the flexibility attributes comprises at least one flexibility tolerance relating to the corresponding object.

A flexibility tolerance can be expressed by numerical values and/or by classes. The classes can then express tolerances by numerical values. The parameters expressed by the tolerances can relate to the geometry and/or dimensions of the object. They can also relate to various technical aspects well-known in the field of this invention, e.g. the IFC catalogue of technical aspects (Industry Foundation Classes 1.5), like resistance, acoustic insulation, thermal insulation, acoustics, energetic performance, brightness, pollution, flow rate, localization, . . . , and any combination thereof.

According to a preferred embodiment, the infrastructure is comprised of at least one or several of the following: architectural construction; building structural construction; mechanical, electrical and/or plumbing infrastructure; heating, ventilating and/or air-conditioning infrastructure; site layout; façade component etc.

According to a preferred embodiment, each of the at least one flexibility attribute is based on flexibility parameters relating to the corresponding object, said parameters being taken from the following list: position, dimension, cost, time for change, state of progress, state of storage, and any combination therefore, related to said object.

According to a preferred embodiment, each of the at least one flexibility attribute comprises a value, preferably a numerical value, computed on the basis of the corresponding flexibility parameters, said computation resulting in averaging said parameters.

According to a preferred embodiment, at least one of the flexibility parameter(s) comprises a numerical dimensional tolerance, preferably associated with the size and/or position of the corresponding object.

According to a preferred embodiment, at least one of the flexibility parameter(s) comprises a numerical value reflecting a cost or a time related to the corresponding object.

According to a preferred embodiment, the at least one flexibility parameter comprises, in addition, a numerical value reflecting a total cost or construction time of the infrastructure.

According to a preferred embodiment, the method further comprises outputting a digital model of the infrastructure, said model comprising the objects with the at least one flexibility attribute.

The invention is also directed to a method for merging and managing several digital two-, three- or more than three-dimensional infrastructure models, said method comprising the following steps: (a) importing and aggregating the models; (b) automatically detecting potential conflict(s) between objects of the models; wherein at least one of the models is generated according to the method of digitally modeling in two, three or more dimensions an infrastructure according to the invention, and the method for merging and managing several digital two, three or more than three dimensional infrastructure models comprises the further step of: (c) automatically searching for at least one possible solution to each of the at least one conflict, based on the flexibility attribute(s) of the objects related to the conflict.

According to a preferred embodiment, the at least one possible solution comprises a change in position, size, and/or type of at least one of the objects related to the conflict, said change being based on the flexibility attribute of said object(s).

According to a preferred embodiment, the at least one object whose position, size and/or type is changed for solving to the conflict is/are selected among the objects related to the conflict on the basis of a criterion of highest flexibility attribute. The object(s) with the highest flexibility attributes will be considered first. Advantageously, only those objects with a flexibility attribute higher than a pre-determined level will be considered.

According to a preferred embodiment, each of the at least one flexibility attribute is based on flexibility parameters relating to the corresponding object, said parameters being taken from the following list: position, dimension, cost, time for change, state of progress, state of storage, and any combination therefore, related to said object, and step (c) comprises, for each conflict, exploring in an iterative manner changes to at least one of the objects related to said conflict, said changes being based on the flexibility parameters of said object, and for each change checking to which extent said conflict is solved.

According to a preferred embodiment, in step (c) the exploration of changes to the at least one object is made within a numerical dimensional tolerance contained in the flexibility parameter(s) of said object(s)

According to a preferred embodiment, step (c) further comprises, for each solution, detecting potential conflict(s) with other objects.

According to a preferred embodiment, step (c) further comprises selecting at least one solution that does not conflict with the other objects.

According to a preferred embodiment, the method further comprises a further step of: (d) issuing a report of the conflict solution(s), said report containing information about modifications of the solution(s) to the conflict(s).

According to a preferred embodiment, the method further comprises a further step of: (e) updating the models further to the solution(s) to the conflict(s).

According to a preferred embodiment, the detection of potential conflict(s) at step (b) can be based on a geometrical, temporal or other overlap between the objects.

The invention is also directed to a computer program comprising instructions that are executable by a computer, wherein the instructions are configured for executing the steps of the method of digitally modeling in two or three dimensions a building infrastructure according to the invention when running on said computer.

According to a preferred embodiment, the computer program can be a plug-in for a two, three or more than three dimensional infrastructure design computer program. The computer program can also be a web-based platform.

The invention is also directed to a computer program comprising instructions that are executable by a computer, wherein the instructions are configured for executing the steps of the method for merging and managing several digital two, three or more than three dimensional building infrastructure models according to the invention when running on said computer.

The invention is also directed to a computer with a storage medium for a computer program, wherein the storage medium comprises a computer program according to the invention.

Advantages of the Invention

The invention is particularly interesting in that it provides an improvement in the digital models conflicts management. It allows indeed the designer of each building infrastructure to readily associate flexibility attributes for facilitating later one the resolution of conflicts when merging different infrastructure digital models.

BRIEF DESCRIPTION OF THE DRAWINGS

FIG. 1 is representation of a portion of a digital model of the structure of a building.

FIG. 2 is representation of a portion of a digital model of the plumbing of a building.

FIG. 4 illustrates, in a more detailed manner, a flow chart of the BIM manager of FIG. 3.

DESCRIPTION OF AN EMBODIMENT

Figure 3:
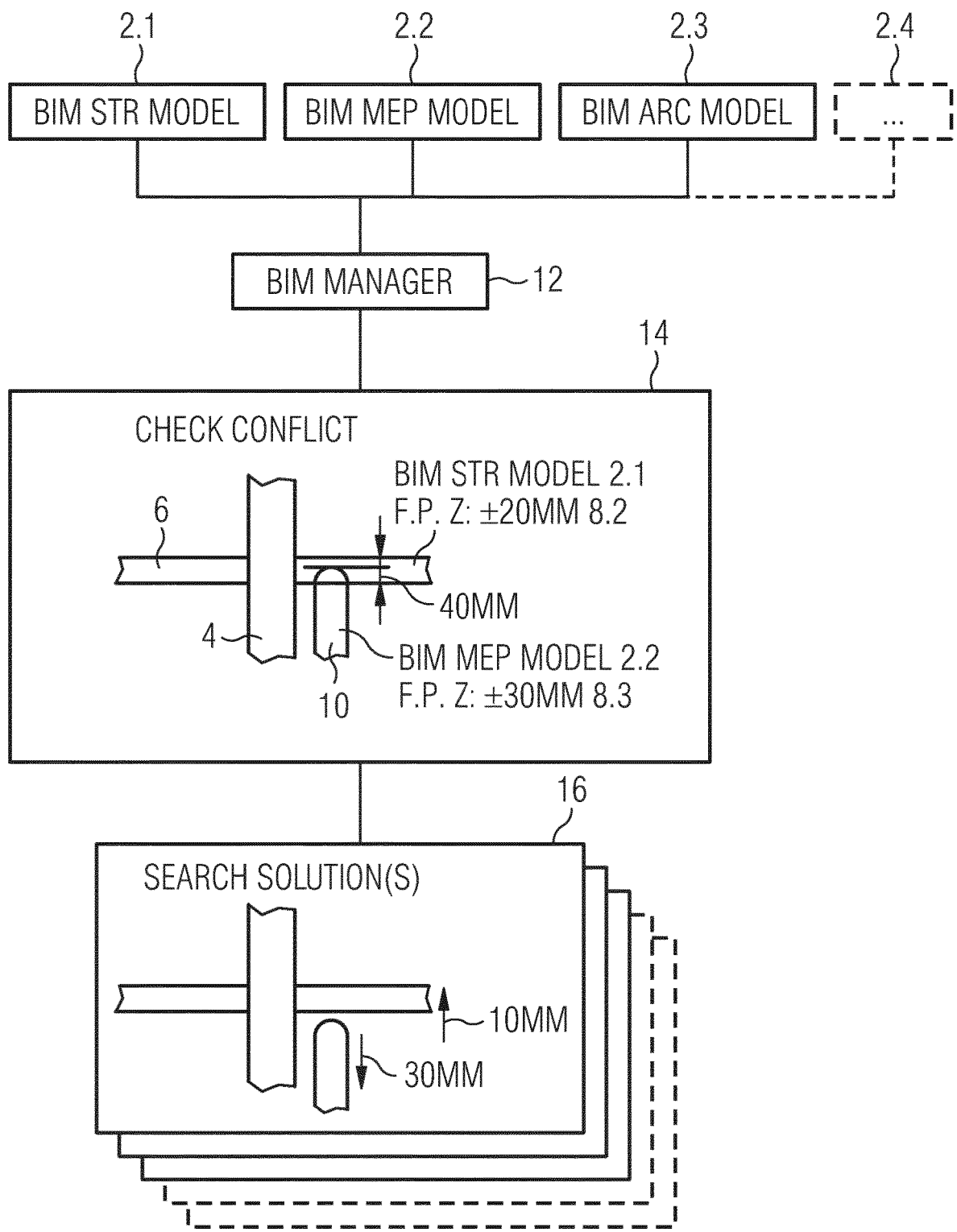
FIG. 3 is a flow chart illustrating the management of conflicts between the two models according to the invention.

FIG. 1 illustrates a portion of representation of a digital model of the structure of a building project. The model is for instance a building information model (BIM) of the structure (STR) type. The model 2.1 comprises, among others, a carrying wall 4 and a concrete slab 6 supported by said wall 4. Such a model can be designed and generated by a commercially available computer application like Autodesk Revit Structure or Nemetschek AllPlan Engineering.

According to the invention, the model 2.1 shows however a particularity that each of the objects that it comprises, for instance the wall 4 and the concrete slab 6, is associated with flexibility attributes 8. Such flexibility attributes are intended to provide useful information for managing conflicts with other models relating to the same building or building area. The flexibility attributes are based on different flexibility parameters relating to the geometry, material and possibly other properties of an object. The geometry can be split into two categories, i.e. the size and the position of the object. Indeed, For instance, the carrying wall 4 is associated with two flexibility geometrical parameters, namely the size and the position. In the present example, the flexibility parameters related both to the size and to the position is zero, meaning that the both size and position of the wall 4 cannot be changed in case of conflict with other objects.

The flexibility attribute 8.1 that is illustrated as a cursor is the result of the different flexibility parameters such as the size, position, cost, time required for change of design and/or construction, etc. The flexibility attribute is a value computed on the basis of these parameters, corresponding to an average value of the different flexibility parameters that are taken into account. For instance, the flexibility attribute of the wall 4 is of a low value.

Similarly to the wall 4, the concrete slab 6 shows a flexibility attribute 8.2, for instance based on flexibility parameters relating to its size and position. In the present example, the parameter related to the size is zero and whereas the position parameter is of zero in the X and Y directions and ±20 mm in the Z direction. In other words, the only flexibility of the slab is in its position parameter related to the Z direction of ±20 mm.

For instance, the flexibility attribute 8.2 of the slab 6 is of a medium value.

The above flexibility attributes can be associated to each object while modeling them with an appropriate computer application. The association of flexibility attributes can be operated by means of an appropriate plug-into such commercial applications. Alternatively, specific desktop or web-based computer applications implementing the above association of flexibility attributes can also be used.

FIG. 2 illustrates a portion of representation of a digital model of the plumbing of a building project. More specifically, the model 2.2 is a building information model (BIM) of the mechanics, electricity and plumbing (MEP) type. For instance, the model 2.2 comprises, among others, as objects, a pipe 10 that extends vertically and horizontally with a bent portion between. For the sake of clarity, the objects of the model of FIG. 1, i.e. the wall 4 and the concrete slab 6, are represented in dashed lines. We can observe that the pipe 10 extends vertically along the wall 4 and horizontally along the slab 6.

Similarly to the objects of the BIM STR model 2.1 of FIG. 1 and according to the invention, the pipe model 2.2 is associated with a flexibility attribute 8.3, for instance based on flexibility parameters relating to its size and position, cost, time for change (design and/or construction), state of material delivery and the type of pipe. The size parameter is zero and the position parameter is ±10 mm in the X and Y directions and is ±30 mm in the Z direction. The size of the pipe corresponds essentially to its diameter. Its flexibility can be quite reduced as it very often results from a calculation related to the overall length of the pipe and its nominal flow. It is however thinkable that contrary to the present example, the diameter of the pipe shows a certain tolerance as flexibility attribute.

For instance, the computed flexibility attribute 8.3 of the pipe 10 is of a high value.

FIG. 3 illustrates a flow chart of the conflict management between models, according to the invention. The different models, e.g. a BIM STR model 2.1 like the one of FIG. 1, a BIM MEP model 2.2 like the one of FIG. 2, a BIM ARC (architecture) model 2.3 and/or any other model 2.4, are collected by a building information model (BIM) manager 12. The potential conflicts between objects of the different models are detected using a dedicated software system. For instance, in relation with the BIM STR model 2.1 of FIG. 1 and the BIM MEP model 2.2 of FIG. 2, the BIM manager 12 checks 14 for a potential conflict between the wall 4, the slab 6 and the pipe 10. As is apparent at 14, the pipe 10 is in geometrical conflict with the slab 6 in that the upper surface of the horizontal portion of the pipe 10 overlaps the slab 6 by 40 mm in the Z direction. Based on the flexibility attributes of the slab 6 and the pipe 10 which are medium and high, respectively, the BIM manager will search for a conflict solution by looking at potential changes to each of the slab and pipe, preferably however with to the pipe at first in view of its higher flexibility. More specifically the flexibility position parameters in the Z direction, namely of ±20 mm for the slab and ±30 mm for the pipe, the BIM manager 12 searches at 16 a conflict solution consisting, for instance, in lowering the pipe 10 by 30 mm and raise the slab 6 by 10 mm.

At step 16, the BIM manager 12 can search for different solutions to the conflicts. For example, depending on a classification of the objects involved in the conflict to be solved, the BIM manager 12 can store different standard solutions. Still at step 16, the BIM manager 12 can therefore, based on classification parameters of the objects involved in the conflict, select standard solutions and adapt them to the situation based on parameters of the conflict and the objects. The BIM manager 12 can also (based on the geometrical parameters of the conflict) compute (e.g. by iteration and/or calculation) a geometrical solution that might consists in moving one or several of the objects involved in a main direction of the conflict (i.e. a direction that provides a conflict resolution with a minimum displacement of the object(s)).

The above conflict management is simplified and purely exemplary. With reference to the above example of FIGS. 1 to 3, the attribute can be based on the thickness of the slab, where the composition of the slab can be changed to have a slab that is less thick. Such a parameter should be fixed by the structure engineer. Another element that can influence the flexibility attribute of the slab is the height of a floor and in general we can also talk about the height of the entire building where sometimes, this height is constrained by urban regulations.

Generally speaking, the flexibility attributes can be based, besides the size, position and type, also on cost and time parameters. The flexibility parameters can also be related to the state of progress and/or the state of storage of the related object. The state of progress means in essence to which extent the object is already build and/or in place. The flexibility attribute of a concrete slab or wall that is already built is lower than if it had not yet been built. Similarly, an object whose material is already stored on the building site shows a lower flexibility than if that material is not yet on the site. The presence of the material on the building site occupies a useful place so that it is not wished that this material remains a longer time on the site.

FIG. 4 illustrates, in a more detailed manner, a flowchart of the BIM manager 12. The different models, for instance the BIM models 2.1, 2.2, 2.3 and/or 2.4, provided with flexibility attributes 8, are imported and aggregated at step 18 as flexible models. If needed, a site scanning 20, providing information about the state of progress of the construction of the different objects of the models and/or about the state of store of material necessary for the construction of the objects and/or natural objects, can be achieved and inputted to the BIM manager 12. Based on the information provided by the site scanning 20, the flexibility attributes of the models can be updated 22. Indeed, if the site scanning reveals that the concrete slab 6 of the BIM STR model 2.1 illustrated in FIG. 1 is already built, its flexibility attribute is then updated by lowering the corresponding flexibility parameter(s). For instance, the flexibility parameter relating to its position in the Z direction passes from ±20 mm to zero. Also, if the site scanning reveals that the pipe lengths necessary for building the pipe 10 of the BIM MEP model 2.2 as illustrated in FIG. 2 are already available at a storage area at the building site, the flexibility parameters relating to the size and material of the pipe would be lowered, for instance to zero. In the present case, the initial size parameter of that object was already zero, meaning that the site scanning would not change the flexibility attribute of that object.

After the above optional site scanning and update of the flexibility parameters and attributes, the BIM manager checks at step 14 for potential conflicts between the objects of the different models. At step 16 the BIM manager searches for solutions to the potential conflicts, based on the flexibility attributes and/or flexibility parameters. Depending on the nature and/or extent of the conflicts, no solution might be available for a specific conflict, which respects the flexibility attributes and/or parameters of the related objects. In that case, the conflict cannot be solved automatically. Also, several solutions respecting the flexibility attributes and/or parameters might be available for a given conflict. In such a case, one or several optimum solutions is/are selected among the several available solutions. The conflict resolution can also use a library 17 of standard or model solutions for typical situations. Also, the BIM manager looks for potential future conflicts with all other objects and selects only those solutions that do not cause or minimize future conflicts.

At step 24, the BIM manager 12 issues a Building Information Modeling Resolution Exchange Format (BREF) report. This report contains information about the modifications resulting from the solution to the conflict(s).

At step 26, the BIM manager 12 sends the BREF Report to all partners having provided the BIM models for them to update their models based on the solution.

The above conflict resolution between BIM models can be applied to various fields. For example, the project can be a renovation of a facade of an existing building. In that case, a BIM model can be the structure of the building without the existing old facade. Such a model can be obtained by a scanning of the building and a treatment consisting essentially in removing or subtracting the thickness of the old facade. Another BIM model would then be the new facade. Another application example can be the preparation or development of a natural site featuring particularities like a landform and/or the presence of a river with a riverbed that cannot be or only hardly moved. The BIM model of the site can be obtained by scanning or any other known method of measurement of the geography of a site or piece of land. The river would then form an object with a very low or zero flexibility attribute whereas the building or equipment (roads, etc.) to be installed on the site would form objects with flexibility attributes.

The invention claimed is:

1. A method of computationally digitally modeling in two, three, or more dimensions an infrastructure, comprising:
   computationally using digital two- or three-dimensional objects and computationally attributing at least one flexibility attribute to at least one of the objects;
   wherein each of the flexibility attributes comprises at least one flexibility tolerance relating to a corresponding object;
   wherein each of the flexibility attributes is designed for being used in an automated conflict resolution of the corresponding object with another digital two- or three-dimensional object when computationally merging said infrastructure model with another infrastructure model;
   wherein each of the tolerance(s) is a flexibility parameter taken from a following list:
   position, dimension, cost, time for change, state of progress, state of storage, and any combination thereof, related to said object;
   wherein each of the at least one flexibility attribute comprises a numerical value computed on a basis of corresponding flexibility parameters, said computation resulting in averaging said parameters;
   said method comprising following steps:
   (a) importing and aggregating the models with the at least one flexibility attribute;
   (b) automatically detecting potential conflict(s) between objects of the models;
   (c) automatically searching for at least one possible solution to each of the at least one conflict, based on the flexibility attribute(s) of the objects related to the conflict.

2. The method according to claim 1, wherein the infrastructure is comprised of at least one or several of the following:
   architectural construction;
   building structural construction;
   mechanical, electrical and/or plumbing infrastructure;
   heating, ventilating and/or air-conditioning infrastructure;
   site layout; façade component.

3. The method according to claim 1, wherein at least one of the tolerance(s) is a numerical dimensional tolerance associated with the size and/or position of the corresponding object.

4. The method according to claim 1, wherein at least one of the flexibility parameter(s) comprises a numerical value reflecting a cost or a time related to the corresponding object.

5. The method according to claim 4, wherein the at least one flexibility parameter comprises, in addition, a numerical value reflecting a total cost or construction time of the infrastructure.

6. The method according to claim 1, wherein the method further comprises outputting a digital model of the building infrastructure, said model comprising the objects with the at least one flexibility attribute.

7. A method for computationally merging and managing several digital two, three, or more dimensional infrastructure models;
   wherein at least one of the models is generated using digital two- or three-dimensional objects and attributing at least one flexibility attribute to at least one of the objects, wherein each of the flexibility attributes comprises at least one flexibility tolerance relating to a corresponding object;
   wherein each of the tolerance(s) is a flexibility parameter taken from a following list:
   position, dimension, cost, time for change, state of progress, state of storage, and any combination thereof; related to said object;
   wherein each of the at least one flexibility attribute comprises a numerical value computed on a basis of corresponding flexibility parameters, said computation resulting in averaging said parameters;
   said method comprising following steps:
   (a) importing and aggregating the models with the at least one flexibility attribute;
   (b) automatically detecting potential conflict(s) between objects of the models;
   (c) automatically searching for at least one possible solution to each of the at least one conflict, based on the flexibility attribute(s) of the objects related to the conflict.

8. The method according to claim 7, wherein the at least one possible solution comprises a change in position, size and/or type of at least one of the objects related to the conflict, said change being based on the flexibility attribute(s) of said object(s).

9. The method according to claim 8, wherein the at least one object whose position, size and/or type is changed for solving to the conflict is/are selected among the objects related to the conflict on the basis of a criterion of highest flexibility attribute.

10. The method according to claim 7, wherein
step (c) comprises, for each conflict, exploring in an iterative manner changes to at least one of the objects related to said conflict, said changes being based on the flexibility parameter(s) of said object, and for each change checking to which extent said conflict is solved.

11. The method according to claim 10, wherein in step (c) the exploration of changes to the at least one object is made within a numerical dimensional tolerance contained in the flexibility parameter(s) of said object(s).

12. The method according to claim 7, wherein step (c) further comprises, for each solution, detecting potential conflict(s) with other objects.

13. The method according to claim 12, wherein step (c) further comprises selecting at least one solution that does not conflict with the other objects.

14. The method according to claim 7, wherein the method further comprises a further step of:
(d) issuing a report of the conflict solution(s), said report containing information about modifications of the solution(s) to the conflict(s).

15. The method according to claim 14, wherein the method further comprises a further step of:
(e) transmitting the report for updating the models further to the solution(s) to the conflict(s).

16. The method according to claim 7, wherein the detection of potential conflict(s) at step (b) can be based on a geometrical, temporal or other overlap between the objects.

17. A non-transitory computer readable medium storing a computer program having instructions that are executable by a computer, the instructions configuring said computer to perform steps of merging and managing several digital two, three, or more dimensional infrastructure models;
wherein at least one of the models is generated using digital two- or three-dimensional objects and attributing at least one flexibility attribute to at least one of the objects, wherein each of the flexibility attributes comprises at least one flexibility tolerance relating to a corresponding object;
wherein each of the tolerance(s) is a flexibility parameter taken from a following list:
position, dimension, cost, time for change, state of progress, state of storage, and any combination thereof, related to said object;
wherein each of the at least one flexibility attribute comprises a numerical value computed on a basis of corresponding flexibility parameters, said computation resulting in averaging said parameters;
said method comprising following steps:
(a) importing and aggregating the models with the at least one flexibility attribute;
(b) automatically detecting potential conflict(s) between objects of the models;
(c) automatically searching for at least one possible solution to each of the at least one conflict, based on the flexibility attribute(s) of the objects related to the conflict.

18. The non-transitory computer readable medium according to claim 17, wherein the computer program is a plug-in for a two, three, or more dimensional infrastructure design computer program or a web-based platform.

* * * * *